(12) United States Patent
El-Beltagy et al.

(10) Patent No.: US 8,799,498 B2
(45) Date of Patent: Aug. 5, 2014

(54) METHOD AND DEVICE FOR PEER ARRANGEMENT IN STREAMING-CONSTRAINED P2P OVERLAY NETWORKS

(75) Inventors: Mohammed El-Beltagy, Stockholm (SE); Amgad Naiem, Stockholm (SE)

(73) Assignee: Peerialism AB, Stockholm (SE)

( * ) Notice: Subject to any disclaimer, the term of this patent is extended or adjusted under 35 U.S.C. 154(b) by 279 days.

(21) Appl. No.: 13/299,957

(22) Filed: Nov. 18, 2011

(65) Prior Publication Data

US 2013/0132601 A1     May 23, 2013

(51) Int. Cl.
*G06F 15/16* (2006.01)
(52) U.S. Cl.
USPC ............ 709/231; 709/201; 709/204; 709/245
(58) Field of Classification Search
USPC .................................. 709/201, 204, 231, 245
See application file for complete search history.

(56) References Cited

U.S. PATENT DOCUMENTS

| | | | | |
|---|---|---|---|---|
| 6,065,062 | A * | 5/2000 | Periasamy et al. | 709/242 |
| 6,304,980 | B1 * | 10/2001 | Beardsley et al. | 714/6.23 |
| 6,715,005 | B1 | 3/2004 | Rodriguez et al. | |
| 7,698,460 | B2 | 4/2010 | Zhang et al. | |
| 7,975,282 | B2 | 7/2011 | Deshpande et al. | |
| 7,978,631 | B1 * | 7/2011 | Abdelaziz et al. | 370/255 |
| 7,996,547 | B2 * | 8/2011 | Sudhakar | 709/229 |
| 8,037,023 | B2 | 10/2011 | Liu et al. | |
| 2004/0034791 | A1 * | 2/2004 | Savathphoune | 713/200 |
| 2004/0143672 | A1 | 7/2004 | Padmanabham et al. | |
| 2005/0044147 | A1 | 2/2005 | Yap | |
| 2006/0190615 | A1 | 8/2006 | Panwar et al. | |
| 2006/0259607 | A1 | 11/2006 | O'Neal et al. | |
| 2007/0140110 | A1 * | 6/2007 | Kaler | 370/218 |
| 2008/0037527 | A1 | 2/2008 | Chan et al. | |
| 2008/0205291 | A1 | 8/2008 | Li et al. | |
| 2008/0263208 | A1 | 10/2008 | White | |
| 2008/0294779 | A1 | 11/2008 | Gkantsidis et al. | |
| 2008/0317028 | A1 | 12/2008 | Chockler et al. | |
| 2009/0043893 | A1 | 2/2009 | Pendarakis et al. | |
| 2009/0106802 | A1 | 4/2009 | Zuckerman et al. | |
| 2009/0119265 | A1 | 5/2009 | Chou et al. | |
| 2009/0119734 | A1 | 5/2009 | Deshpande et al. | |

(Continued)

OTHER PUBLICATIONS

*Microsoft Computer Dictionary*. (2002). Redmond, Wash: Microsoft Press. 4 pp.
International Search Report, Application No. PCT/EP2012/072411, Feb. 20, 2013.
Written Opinion of the International Searching Authority, Application No. PCT/EP2012/072411, Feb. 20, 2013.

(Continued)

*Primary Examiner* — Liangche A Wang
(74) *Attorney, Agent, or Firm* — Myers Bigel Sibley & Sajovec, PA

(57) ABSTRACT

The present invention relates to a method of and a device for arranging a P2P overlay network comprising a streaming source arranged to stream data content and a plurality of peers arranged in distribution layers. The method comprises the step of arranging the peers in the distribution layers such that data content download requirements of peers in any one distribution layer does not exceed data content distribution capacity of an immediately preceding distribution layer. The method further comprises the step of selecting, when a first peer has capacity to distribute a data content stream to another peer in an immediately subsequent layer but is restricted from doing so, a second peer from a distribution layer subsequent to that of the first peer, which second peer is not being restricted from distributing the data content stream to said another peer.

20 Claims, 7 Drawing Sheets

(56) References Cited

U.S. PATENT DOCUMENTS

| | | | |
|---|---|---|---|
| 2009/0164576 A1 | 6/2009 | Noh et al. | |
| 2009/0177792 A1 | 7/2009 | Guo et al. | |
| 2009/0234917 A1 | 9/2009 | Despotovic et al. | |
| 2009/0323700 A1 | 12/2009 | Schwan et al. | |
| 2010/0146053 A1 | 6/2010 | Jiang | |
| 2010/0146092 A1 | 6/2010 | Hu et al. | |
| 2010/0146569 A1 | 6/2010 | Janardhan et al. | |
| 2010/0189259 A1* | 7/2010 | Kaler | 380/255 |
| 2010/0250678 A1 | 9/2010 | Hu et al. | |
| 2010/0262709 A1 | 10/2010 | Hiie et al. | |
| 2011/0161417 A1 | 6/2011 | Le Scouarnec et al. | |
| 2011/0307115 A1 | 12/2011 | Pereira et al. | |
| 2012/0030333 A1 | 2/2012 | Hu et al. | |
| 2012/0210014 A1 | 8/2012 | El-Beltagy | |
| 2013/0091294 A1 | 4/2013 | El-Beltagy et al. | |
| 2013/0132602 A1 | 5/2013 | El-Beltagy et al. | |

OTHER PUBLICATIONS

International Search Report, Application No. PCT/EP2012/069509, Feb. 28, 2013.
Written Opinion of the International Searching Authority, Application No. PCT/EP2012/069509, Feb. 28, 2013.
Roverso et al., "On the Feasibility of Centrally-Coordinated Peer-To-Peer Live Streaming", *The 8$^{th}$ Annual IEEE Consumer Communications and Networking Conference—Special Session on Scalable Adaptive Multicast in P2P Overlays*, Jan. 9, 2011, pp. 1061-1065.
Roverso et al., "Peer2View a Peer-To-Peer HTTP-Live Streaming platform", *IEEE 12$^{th}$ International Conference on Peer-to-Peer Computing (P2P)*, Sep. 3, 2012, pp. 65-66.
Small et al., "Scaling Laws and Tradeoffs in Peer-to-Peer Live Multimedia Streaming" *Multimedia '06 Proceedings of the 14th annual ACM international conference on Multimedia*, Jan. 2, 2006, pp. 539-548.

* cited by examiner

METHOD AND DEVICE FOR PEER ARRANGEMENT IN STREAMING-CONSTRAINED P2P OVERLAY NETWORKS

TECHNICAL FIELD

The invention relates to a method and a device for arranging a streaming-constrained P2P overlay network.

BACKGROUND

For live video streaming in a client-server approach, the video stream is downloaded from the streaming server (i.e. source) to the client. A video stream consists of a set of consecutive data pieces that the client periodically requests in order to play the video. A scalable live streaming service requires high streaming server bandwidth to satisfy an increasing number of clients over the internet. In order to reduce the cost of the streaming server, Peer-to-peer (P2P) live streaming has been developed. The basic concept of P2P live streaming is to make the clients, referred to as peers in this context, share the load with the streaming server.

P2P live streaming systems has gained a lot of interest in the recent years as it has the advantage of allowing a streaming source to broadcast e.g. a live video event to a large number of peers, without having to provide all the required bandwidth. This is done by making use of the peers' upload capacity to assist the streaming source in broadcasting the content to the peers.

P2P networks comprise any networks composed of entities that each provides access to a portion of their resources (e.g., processing capacity, disk storage, and/or bandwidth) to other entities. The P2P concept differs from traditional client/server architecture based networks where one or more entities (e.g., computers) are dedicated to serving the others in the network. Typically, entities in a P2P network run similar networking protocols and software. Applications for P2P networks are numerous and may for example comprise transporting and/or storing data on the Internet, such as video distribution for content owners.

Many approaches have been developed to efficiently make use of the upload capacity of the peers. These approaches can be divided into two main categories.

Tree-based systems are based on constructing one or more structured trees in an overlay network where peers at the top of each tree feed the peers below them. This approach works well when the peers do not join or leave the system at high frequency as data flow is achieved without any further messages between the peers. However, in a high churn environment, tree maintenance can be very costly and destruction and reconstruction of the tree(s) are sometimes necessary.

Mesh-based systems do not enforce a tree construction, or in other words; peer connectivity does not form a specified overlay, but the peers are connected to each other in an unstructured manner. They exchange data through so called gossip communication or by sending data request messages to each other. A disadvantage with mesh-based systems is that they can have a long setup time, as nodes need to negotiate with each other to find peers. However, many systems use the mesh-based approach as it is very robust to high churn. In such systems each peer has a number of neighbours that it potentially downloads from and failure of any neighbour is thus not as critical as in tree-based approaches.

Although individual peers take decisions locally without a global view in the mesh-based approaches, they can still reach comparable savings to tree based approaches when peer churn is considered, mainly since they do not have to carry the heavy overhead of maintaining a view of the global connectivity structure.

In P2P networks, peers of a given category may be restricted from distributing data to peers of a certain other category. For instance, firewalls may be a problem and geographic constrains another. A system designer may apply constraints to a P2P network such that a peer in Europe can connect to any other peer in Europe or Russia, but not to a peer in China, whereas a Russian peer could connect either one. Thus, peers are categorized in connectivity groups, which categorization controls to which other peer connectivity groups the peers can connect.

In P2P networks, problems may occur in cases where peers are located behind network address translators making establishing of connections between peers difficult and sometimes even impossible. Network address translation (NAT) allows a network device, such as a router or a firewall, to assign a public address to a group of computers inside a private network such as a local area network (LAN), in order to limit the number of public IP addresses an organization or company must use. Thus, only a single, unique IP address is required to represent the entire group of computers. However, since IP end-to-end connectivity across a network is set aside with the use of NAT, it may not be possible to establish a connection between any two given peers. There are several different NAT types (full-cone, restricted-cone, port-restricted, symmetric, etc.), some being compatible for communication with each other, while others are not. There are several methods for enabling NAT restricted peers to establish a connection, such as e.g. STUN, TURN and ICE. However, these methods are not always guaranteed to work and their effectiveness at establishing a connection between any two given NAT types can be expressed probabilistically. To conclude, this restriction ultimately results in reduced bandwidth savings on the streaming server.

SUMMARY

An object of the present invention is to solve or at least mitigate these problems in the art.

This object may be achieved in a first aspect of the present invention by a method of arranging a P2P overlay network comprising a streaming source arranged to stream data content and a plurality of peers arranged in distribution layers. The method comprises the step of arranging the peers in the distribution layers such that data content download requirements of peers in any one distribution layer does not exceed data content distribution capacity of an immediately preceding distribution layer. The method further comprises the step of selecting, when a first peer has capacity to distribute a data content stream to another peer in an immediately subsequent layer but is restricted from doing so, a second peer from a distribution layer subsequent to that of the first peer, which second peer is not being restricted from distributing the data content stream to said another peer. Moreover, the method comprises the step of switching positions of the first peer and the selected second peer in the overlay network.

This object may be achieved in a second aspect of the present invention by a device for arranging a P2P overlay network comprising a streaming source arranged to stream data content and a plurality of peers arranged in distribution layers. The device comprises a processing unit being configured to arrange the peers in the distribution layers such that data content download requirements of peers in any one distribution layer does not exceed data content distribution capacity of peers in an immediately preceding distribution layer. Further, the processing unit is configured to select, when a first peer has capacity to distribute a data content stream to another peer in an immediately subsequent layer but is restricted from doing so, a second peer from a distribution layer subsequent to that of the first peer, which second peer is not being restricted from distributing the data content stream to said another peer. Moreover, the processing unit is configured to switch positions of the first peer and the selected second peer in the overlay network.

A potential advantage of the present invention is that it reduces load on the streaming source in a P2P overlay network where restrictions for streaming data content is imposed.

In embodiments of the present invention, peers in the P2P overlay network are generally arranged in distribution layers such that peers with higher upload bandwidth are placed closer to the streaming source to allow for greater bandwidth savings in the network. The peers are arranged in the distribution layers in such a manner that the sum of the peers' upload capacity in any given layer is more than enough to provide for the peers in an immediately subsequent layer. That is, the number of peers arranged in a particular layer is selected such that their total bandwidth demand does not exceed the upload capacity of the peers of the immediately preceding layer. As previously mentioned, in the presence of data streaming restrictions, such as e.g. NAT restrictions, a situation may arise where although peers have available bandwidth, connections cannot be established and hence some peers may have to fall back on the streaming source for download of data content which otherwise should have been uploaded by other peers, in order to continue watching the live data content stream. With the present invention, the P2P overlay network is configured such that a peer is connected to a peer of an immediately preceding layer in a manner that reduces, or even minimizes, the number of potential streaming source fall-backs. If one or more peers in a particular distribution layer are restricted from uploading a data content stream to further peers in an immediately subsequent layer, these failing peers are moved to subsequent layer(s) while a corresponding number of peers are carefully selected from subsequent layers and moved to the vacant positions of the peers who failed in uploading data. The peers that are moved up in the layers are selected such that they are not restricted from uploading data to the peers for which the previous attempt to upload data failed due to restrictions, and can thus effect the required upload of data content. Thus, the present invention is advantageous in that peers are arranged in the overlay such that data content can be streamed regardless of imposed restrictions. Ultimately, this reduces the load on the streaming source as peer restructuring is undertaken such that data content can be streamed from one peer to another without having to fall back on the source. Further advantageously, peers failing to effect data upload are moved away from the source further down the distribution layers.

In an embodiment of the present invention, the peers are grouped into different categories, wherein peers of one category are restricted from communicating with peers of a different category. Thus, data streaming restrictions imposed on the network are reflected in the categorization. In a particular embodiment of the present invention, the peers are categorized into different NAT categories. Advantageously, to facilitate management of the data content streaming restrictions imposed on the P2P overlay network, peers are grouped into different categories reflecting the particular restrictions imposed. For instance, a first set of peers may be categorized into group 1, while a second set of peers are categorized into group 2, and a third set of peers are categorized into group 3. The restrictions imposed on the P2P network may e.g. indicate that peers of group 1 are allowed to communicate with peers of group 3, while the peers of group 2 freely can communicate with the peer of group 1 as well as with the peers of group 2, whereas peers of groups 1 and 3 cannot communicate with each other at all. By performing the peer categorization, subsequent arrangement of the P2P overlay is greatly facilitated.

In an embodiment of the present invention, the second peer is randomly selected from the distribution layer immediately subsequent to the first peer. The following criteria must be fulfilled for the second peer:

(a) the second peer should not be restricted from distributing data content to the peer to which the first peer failed to upload, (b) it should have sufficient bandwidth capacity to distribute the data content, and (c) it should not be restricted from receiving data content from the peer that was distributing data to the failing peer If these three requirements are fulfilled, the second peer can be selected, possibly from a plurality of peers satisfying the requirements, to switch position in the P2P overlay network with the first peer which failed to upload data due to restrictions imposed on the overlay. This embodiment is advantageous for processing reasons, since it does not put that much burden on a tracker device handling the arrangement of the P2P overlay network.

In another embodiment of the present invention, which is more elaborate in selecting a second peer to replace the first peer in a preceding distribution layer, it is determined which peer category, in a distribution layer that comprises one or more peers that should be moved to a subsequent layer, that has the least fulfilled data content download requirements. Thus, the peer category which is the most unprovided for—in terms of number of required downloaded data sub-streams for fully rendering a given data content—is determined. As will be described in more detail in the detailed description, a peer may either upload a full data content stream to peers in an immediately subsequent distribution layer, or a data content stream may alternatively be divided into a number of sequential sub-streams in which case a peer must download all the sub-streams in order to fully render to originally streamed data content. To exemplify it is assumed that two peers in the P2P network both require four sub-streams to fully reconstruct original content data. The one peer receives three sub-streams, which has as a consequence that its download demand is effectively unfulfilled by one sub-stream, while the other peer downloads only a single data sub-stream making the download demand unfulfilled by three sub-streams. Of these two peers, said other peer is the one with the least fulfilled data sub-stream download requirements. By determining the peer category having the greatest total deficit of required downloaded data content sub-streams, the tracker device of the present invention is advantageously given an indication of which peer category in a given distribution layer has problem downloading required data content, the peer(s) of which potentially should be moved to a subsequent distribution layer in the P2P overlay network.

In an embodiment of the invention, the arranging of peers in distribution layers is undertaken for successive pairs of layers such that data content streaming between any two layers are taken into consideration starting from the layer immediately subsequent to the streaming source and ending at the layer immediately preceding the last distribution layer. Thus, the first and second distribution layers immediately subsequent to the streaming source are filled with peers and switching is undertaken according to the present invention. When the interaction between the first and second layers has been fully considered and peer positions switched, the tracker device proceeds to the next successive pair of distribution layers, i.e. the second and third distribution layer, up until the layer pair prior to the last network layer. Advantageously, the peer arrangement is undertaken in a structured and methodical manner.

In yet another embodiment of the present invention, it is determined which one of the peers in the category with the least fulfilled data content download requirement that has lowest upload capacity. This determination is advantageous, since that particular peer would have the least disruptive impact on layer formation if it were to switch position with another peer that in a subsequent layer.

In still another embodiment of the present invention it is determined, for the distribution layer immediately preceding the peer to be moved to a subsequent layer, i.e. the layer immediately preceding that of the first peer, which categories have unutilized upload capacity and that further have capacity to upload the required number of data sub-streams such that a downloading peer is able to fully render a data content. Advantageously, this ensures that a second peer that is to switch position with the first peer in the P2P overlay network will be able to be provided for by its immediately preceding distribution layer supplying the second peer with data content streams after the change of position in the network.

In a further embodiment of the present invention, the second peer is identified as the peer having the greatest upload capacity among peers located in distribution layers subsequent to that of the first peer, which peers further are able to download the data content from a peer in the determined category having unutilized upload capacity, have available upload capacity, and belong to a category which is allowed to upload data content to first peer. Advantageously, with this embodiment, a second peer is identified which mathematically ensures that a peer is selected which has the maximal upload capacity, while still complying with requirements that the peer
(a) is located in a layer subsequent to that of the first peer, i.e. the layer formation up until the first peer is not affected,
(b) has available upload capacity, and
(c) belongs to a category which is allowed to stream data content to the category of the first peer.

It is noted that the invention relates to all possible combinations of features recited in the claims. Further features of, and advantages with, the present invention will become apparent when studying the appended claims and the following description. Those skilled in the art realize that different features of the present invention can be combined to create embodiments other than those described in the following.

BRIEF DESCRIPTION OF THE DRAWINGS

The invention is now described, by way of example, with reference to the accompanying drawings, in which.

DETAILED DESCRIPTION

The invention will now be described more fully herein after with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art.

It should be noted that in the exemplifying embodiments of the present invention set forth in the following, data streaming constraints imposed on a P2P overlay network are exemplified in the form of NAT restrictions. However, other constraints restricting a group of peers from streaming data to another group of peers can be envisaged, as has been discussed in the above.

Figure 1:
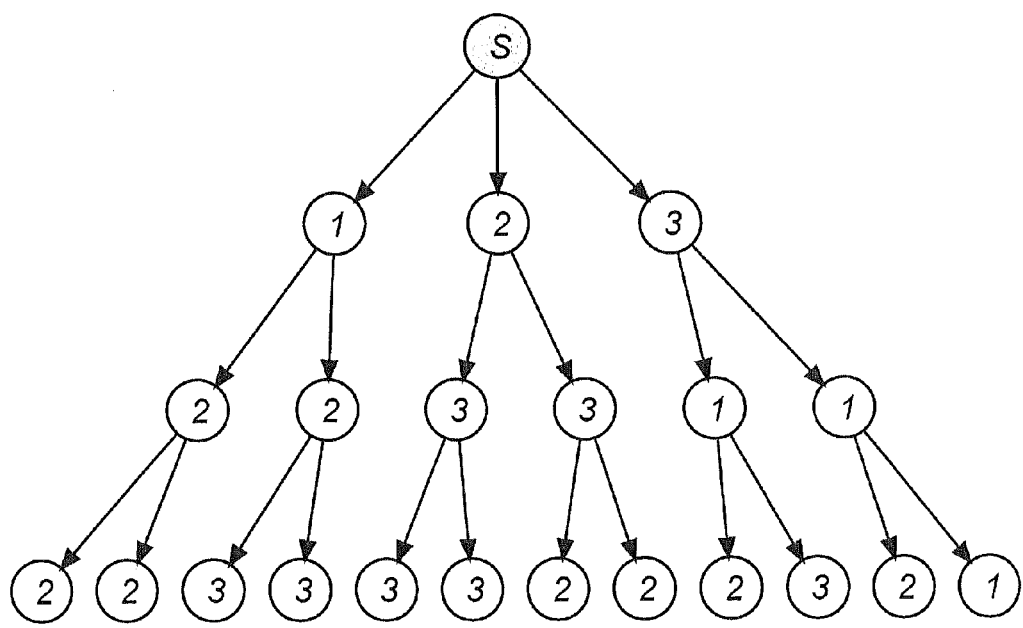
FIG. 1 illustrates a prior art P2P network with a single tree overlay.

FIG. 1 exemplifies a prior art P2P network with a single tree overlay. As can be seen, peers are arranged in rows or distribution layers. Thus, three peers are arranged in distribution layer 1, i.e. the layer closest to streaming source S, six peers are arranged in distribution layer 2 and twelve peers are arranged in distribution layer 3. To illustrate, the streaming source S distributes a given data content stream to the three peers in layer 1, each of which in its turn streams the data content to another two peers in layer 2, and so on. The further away from the streaming source, the greater the playback delay of the data content. In the simplified prior art example P2P network of FIG. 1, each peer has capacity to upload two data content streams. Each peer is hence said to have two "seats" since it can upload two data content streams simultaneously to other peers with a predetermined upload bandwidth. As can be seen, each peer is labelled with a number indicating in which NAT group the peer is categorized. Thus, layer 1 comprises one peer from each of three different NAT groups, the second layer comprises two peers from each of the three NAT groups, etc. In FIG. 1, the three NAT types are assumed to be folly compatible, i.e. there is not restriction on their ability to transfer data to each other.

Figure 2:
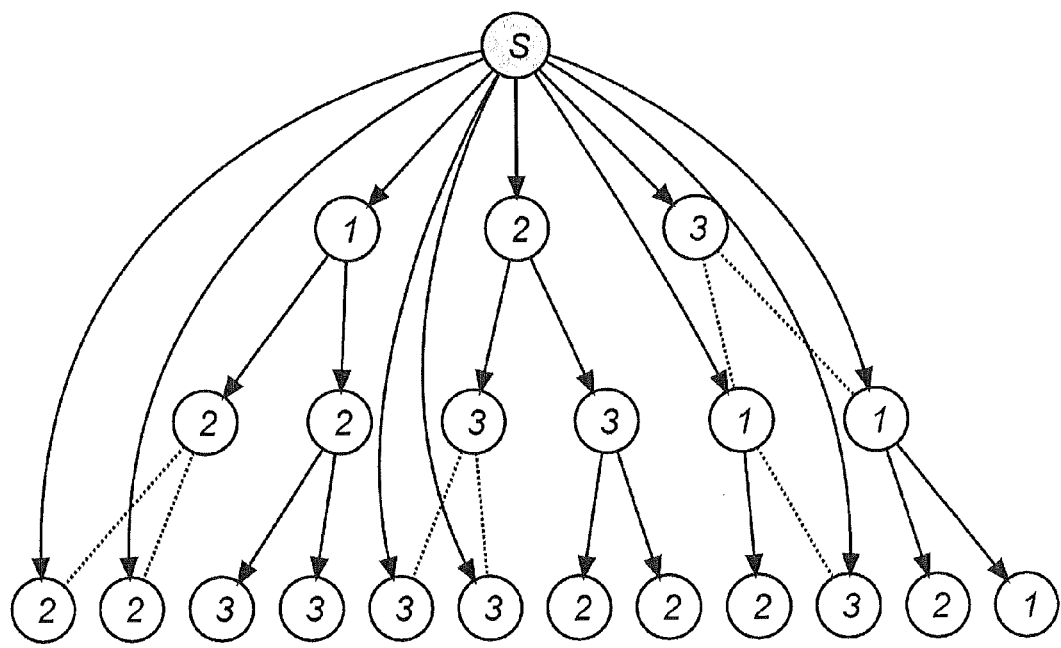
FIG. 2 shows the P2P overlay network of FIG. 1, but where NAT restrictions have been imposed.

FIG. 2 shows the P2P overlay network of FIG. 1 but where NAT restrictions have been imposed. When NAT constraints are imposed on the network, many peers will find themselves without viable uploader and will have to resort to falling back on streaming servers for downloading data content. In the example illustrated in FIG. 2, only the following NAT type pairs can communicate {1-1; 1-2; 2-3}. Many connections are now invalid and the streaming source S experiences a significantly higher load. Dotted lines in FIG. 2 illustrate a situation where a peer cannot distribute data content to another peer in an immediately subsequent layer for NAT restriction reasons.

Thus, even though for instance the peer of NAT type 3 in layer 1 (i.e. the right-most peer of layer 1) has available capacity in the form of two free seats, it still cannot upload data content due to NAT restrictions. As compared to the overlay of FIG. 1, where the streaming source distributes the data content to three peers, the load on the source more than triples (the load increases by 233%). A load increase of his magnitude may have catastrophic consequences for the P2P network.

Figure 3:
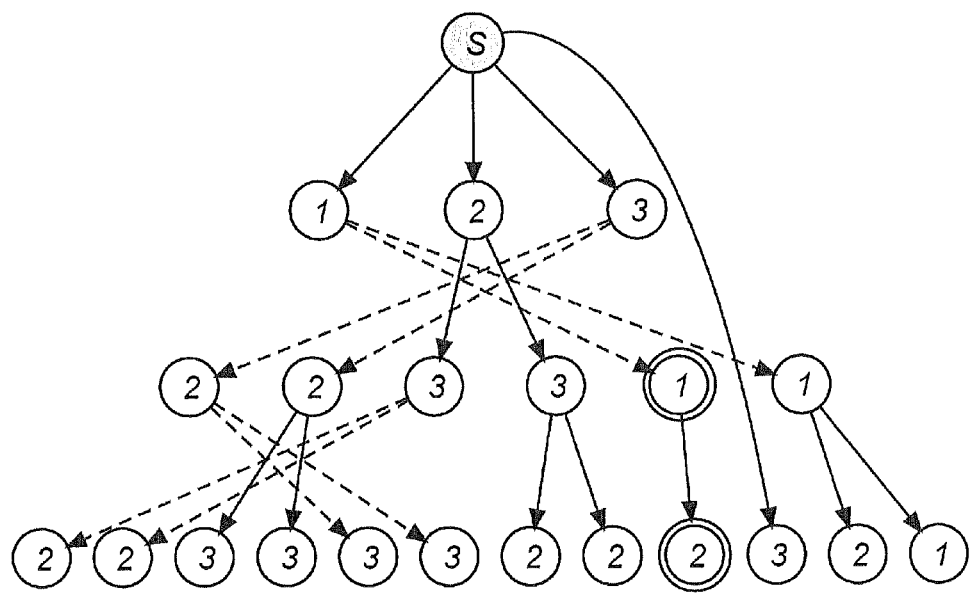
FIG. 3 shows the P2P overlay network of FIG. 2 with a better configuration from a streaming source load point of view.

FIG. 3 shows the P2P overlay network of FIG. 2 (with the same NAT restrictions) but with a better configuration from a streaming source load point of view. The dashed lines represent new peer connections that were not present in the overlay of FIG. 2. As can be seen, peer connectivity has been greatly improved, and the source load increases with 33% as compared to the overlay of FIG. 1 where no NAT restrictions were imposed. As can be deducted from FIG. 3, the peer of NAT type 1 indicated with a double-circle in layer 3 cannot stream data to the peer of NAT type 3 (the third peer from the right) due to the previously defined NAT restrictions, which means that this particular peer will have to fall back on the streaming server for downloading the data content.

Figure 4:
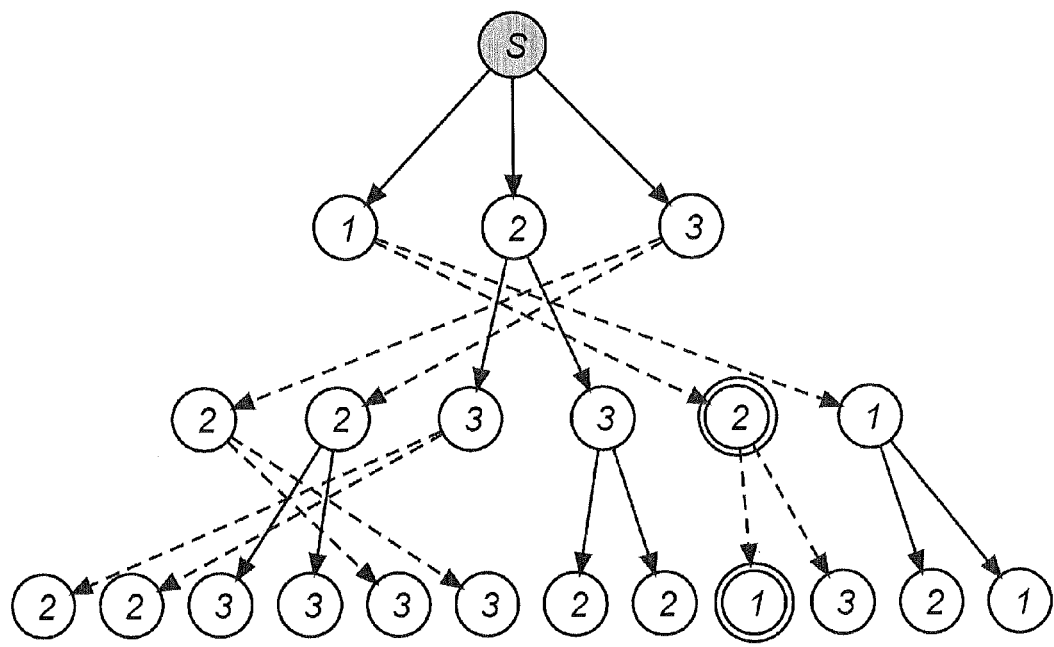
FIG. 4 illustrates the P2P network set forth in FIGS. 1 and 2, but where the peers have been arranged in an overlay network in accordance with an embodiment of the present invention.

FIG. 4 shows a P2P overlay network configured according to an embodiment of the present invention. In this configuration, the two peers indicated by means of double-circles in FIG. 3 is instructed to change places, which has as an effect that the peer of NAT type 2 that is moved up one layer can stream the requested data content to the peer of NAT type 3 (the third peer from the right in the $3^{rd}$ distribution layer), while the load on the streaming source S is the same as in the overlay illustrated in FIG. 1 where no restrictions were imposed.

Figure 5A:
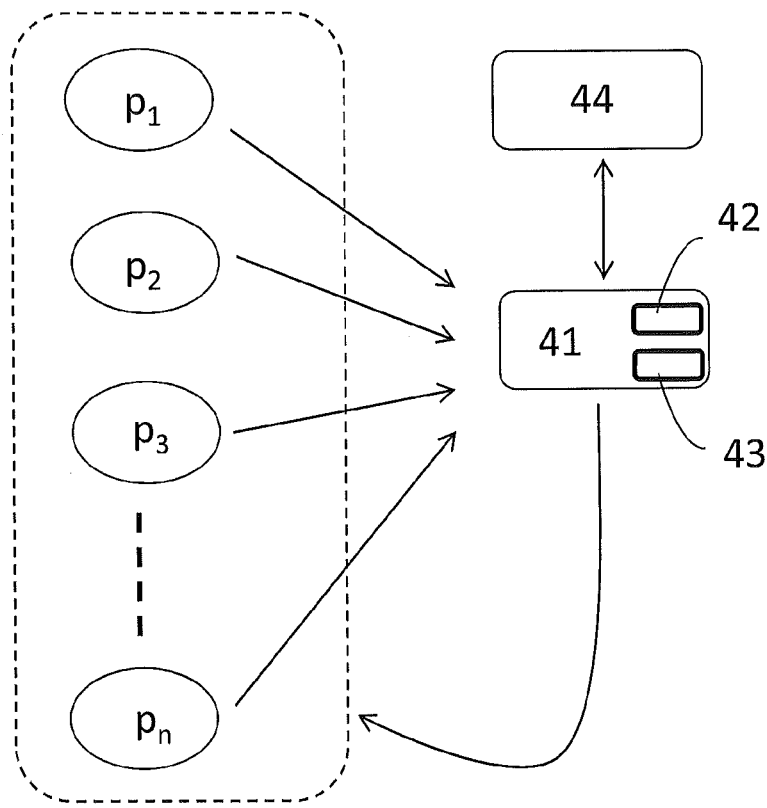
FIG. 5a shows a P2P network in which the present invention can be implemented.

FIG. 5a shows a P2P network in which the present invention can be implemented. A plurality of peers $p_1, p_2, p_3, \ldots, p_n$ is to be arranged in an overlay (e.g. as illustrated in FIG. 4) by tracker 41 with which the peers communicate via interface 42. Further, the tracker is able to communicate with streaming source(s) 44, which provides the peers with data content. For instance, the tracker may need information about the streaming capacity of the source, and the tracker may need to send instructions to the source on how to distributed data content to the peers in the distribution layer located closest to the source. The tracker 41 is typically a device with computing capability facilitated by microprocessor(s) 43. Generally, the tracker is implemented as a computer executing appropriate software stored in associated memory for procuring required functionality. However, other suitable devices with computing capabilities could be used, e.g. an application specific integrated circuit (ASIC), a field programmable gate array (FPGA), a complex programmable logic device (CPLD), etc., in order to control a P2P system and arrange an overlay in accordance with the present invention, while executing appropriate downloadable software stored in a suitable storage area, such as a RAM, a Flash memory or a hard disk. In the P2P network, the tracker 41 receives information of joining and existing peers $p_1, p_2, p_3, \ldots, p_n$, for instance regarding bandwidth capacity of each peer, and determines in which distribution layer a joining peer is to be arranged, or to which layer an existing peer is to be transferred. To this end, the tracker may send each peer a list of other peers that the peer can connect to. In this way, a complete P2P overlay structure is created.

Figure 5B:
FIG. 5b illustrates a method of arranging a P2P overlay network according to an embodiment of the present invention.

With further reference to FIG. 5b, showing a method undertaken by the tracker 41 for arranging peers in a P2P overlay network, the tracker arranges in a first step S401 the peers $p_1, p_2, p_3, \ldots, p_n$ in distribution layers such that the number of peers in any one distribution layer does not exceed data content distribution capacity of peers in the immediately preceding distribution layer. With reference to FIG. 4, it can be seen that all peers are provided for by the immediately preceding layer, where each peer has the capacity to upload two data content streams to the immediately subsequent layer. In step S402 of the method according to an embodiment of the present invention, if it is determined that a first peer indicated with a double circle in distribution layer 2 in FIG. 3 is restricted from distributing the data content stream to the third peer from the right in layer 3 even though it has capacity to distributed a further data content stream, a second peer indicated with a double circle in distribution layer 3 in FIG. 3 is selected since it is not limited by NAT restriction to distribute the data content stream to the third peer from the right in layer 3 and further has free upload capacity. Finally, in step S403, the selected second peer is made to switch position with the first peer. This peer reconfiguration results in the P2P overlay illustrated in FIG. 4, where not more load is imposed on the source S as compared to the no-restriction overlay of FIG. 1.

In the following, embodiments of the present invention will be described in great detail, in particular regarding the underlying mathematical theories.

First, a set of NAT types are defined as $N=\{N_1, N_2, \ldots, N_{mTmax}\}$, where Tmax is the number of different NAT types in the set. Further, the restriction on connectivity between different NAT types is defined by function $\delta(N_i, N_j)$ which is equal to 1 if $N_i$ can upload/download to/from $N_j$, and 0 otherwise.

As previously has been discussed, any two NAT types with $\delta(N_i, N_j)=1$ may not necessarily be able to establish a connection. There is a probability of successfully establishing a connection expressed by $\gamma(N_i, N_j)$. The set of peer NAT types that a peer of NAT type $N_i$ can upload to or download from is expressed by $$\text{con}(N_i \in N) = \{N_j \in N | \delta(N_i, N_j) = 1\}$$

A set of peers entering the P2P overlay network is defined as $P=\{P_1, P_2, \ldots, P_n\}$, where n is the total number of peers trying to join the network. The following functions are defined for the entering peers nat($P_i$)=the NAT type for peer $P_i$,
seat($P_i$)=the number of seats for peer $P_i$,
layer($P_i$)=the distribution layer that peer $P_i$ belongs to As was discussed in connection to FIG. 1, "seats" is terminology used for the number of available upload slots that a peer has. A peer may either upload a full data content stream to peers in an immediately subsequent distribution layer as is shown in FIGS. 1-4, but it may alternatively divide a data content stream into a number of sequential sub-streams or stripes. For instance, instead of having a peer download a given data content stream from a neighbouring peer, it can download half the content as one sub-stream from a first neighbouring peer and the other half of the content as one sub-stream from a second neighbouring peer. Such a division of data content into sub-streams has the advantage that the system can become more resilient to failures if the topology is carefully constructed. One of the known P2P systems using stripes for data content streaming is SplitStream, where topology is designed such that a single peer failure only results in the loss of a single stripe amongst its downloading peers. If sub-streams are constructed using schemes that allow for redundancy such as Multiple Descriptor Coded (MDC) and Forward Error Correction (FEC), the loss of a single stripe will not cause a major disruption in the viewing experience of an end user.

Thus, a stream is divided into a number h of sub-streams/stripes. For instance, if the stream rate is 1 Mbps, and four stripes are used, each stripe would constitute a sub-stream of 256 kbps. Given a peer with an upload capacity of 1.5 Mbps which distributes data to six other peers with a maximum upload capacity of 256 kbps, this peer is said to have six seats since it can upload six stripes simultaneously to other peers with a predetermined upload bandwidth. Such division of bandwidth and seats is made such that a peer arranging device in the P2P overlay network is provided with a simple model of the bandwidth/upload capacities of the peers. In a case where data of an original stream is spread over a number of sub-streams, where none of the sub-streams comprises overlapping data, each peer needs to be downloading all the sub-streams in order to be able to completely reconstruct the original stream. In this particular example, a peer would be required to download four stripes to reconstruct original content data. Such a system more effectively exploits the capacity of each and every peer in the network.

Each peer wishing to tender a complete data content originally distributed by the streaming source will consequently have to download the h data content sub-streams forming the original data content. Thus, if data content is divided into sub-streams, as is often the case in practice, each peer could on the one hand be uploading to a multiplicity of peers, and each peer can be downloading from a multiplicity of peers on the other. The subset of peers that have NAT type $N_i$ is defined by $$P_{N_i} = \{P_i \in P | nat(P_i) = N_i\}.$$

The flow of data between layer r and layer r+1 can be quantified as the total number of seats in layer r that are assigned to peers in layer r+1. The flow of data may further be affected by NAT type restrictions. Hence, upload_flow($N_i$, r) is the number of assigned seats in layer r that belongs to peers of NAT type while download_flow($N_j$, r+1) is the number of data sub-streams that are downloaded by peers of NAT type $N_j$ seated in the seats provided by the immediately preceding layer r+1, or in other words: the total number of downloaded sub-streams of peers having NAT type $N_j$. Conservation of data flow implies that $$\sum_{N_i \in N} \text{upload\_flow}(N_i, r) = \sum_{N_j \in N} \text{download\_flow}(N_j, r+1)$$

For optimal data flow capacity, the two sums should be maximized over all layers.

The set of peers in layer r is defined as $$P_r = \{P_j \in P | \text{layer}(P_j) = r\},$$

and the set of peers of NAT type $N_i$ in that layer is defined as $$P_{N_i,r} = \{P_j \in P | P_j \in P_r, P_j \in P_{N_i}\}.$$

With this definition, an upper bound of the number of data sub-streams that peers in layer r with NAT type $N_i$ can obtain is download_flow($N_j, r$) ≤ $h|P_{N_i,r}|$.

This can be compared to a P2P overlay network with no NAT restrictions imposed, where the number of peers that can be arranged in a given distribution layer r+1 can be calculated as $$|P_{r+1}| = \frac{\sum_{P_j \in P_r} \text{seat}(P_j)}{h}.$$

That is, the number of peers that can be fully seated in layer r+1 is equal to the total number of seats provided by the peers in the immediately preceding layer divided by the number of stripes in which the original data content stream is divided. By "fully seated" is meant that a peer is seated and provided with all stripes necessary to render the original data content.

Figure 6A:
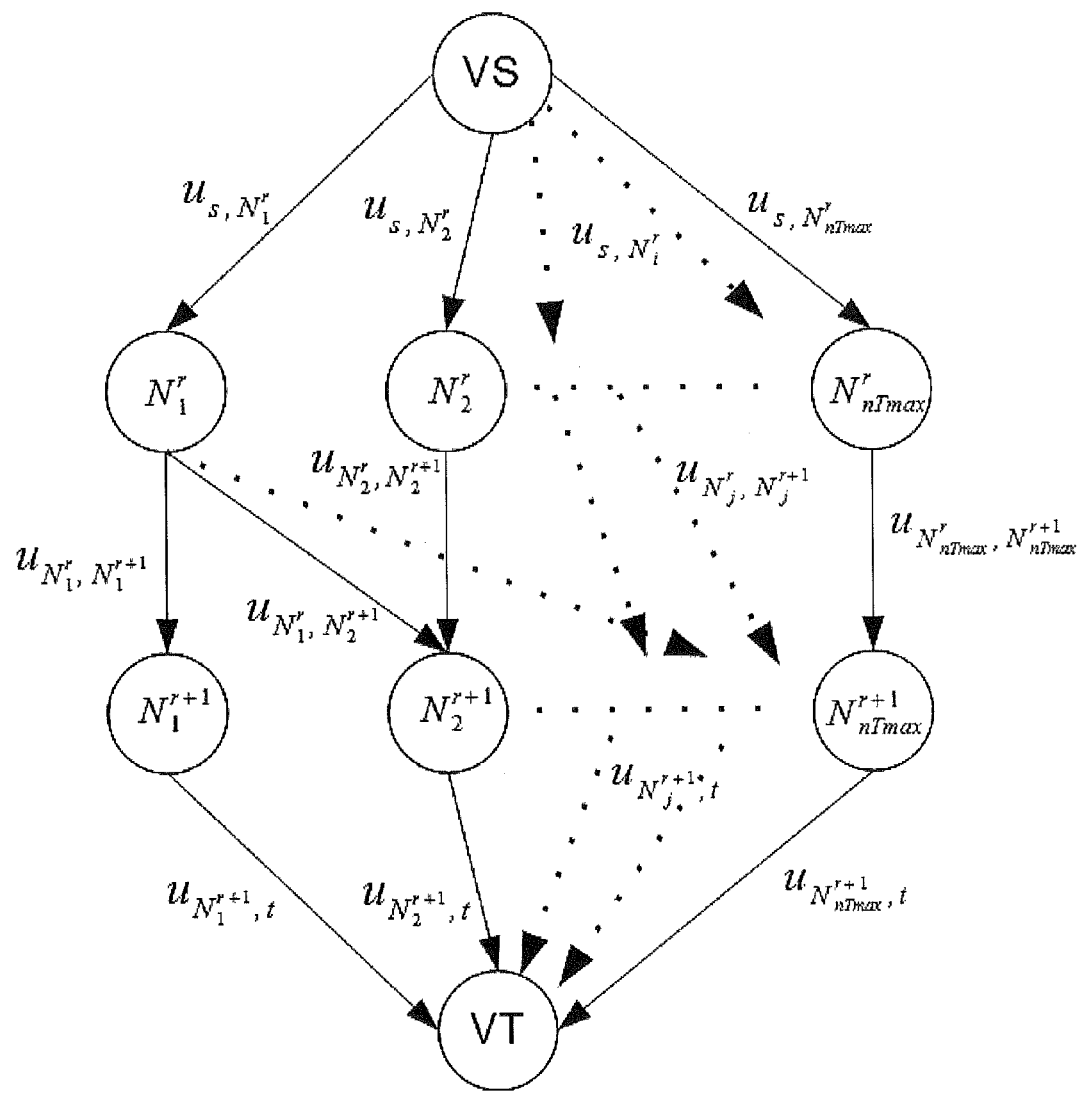
FIG. 6a illustrates peers arranged in a virtual P2P overlay network according to an embodiment of the present invention.
Figure 6B:
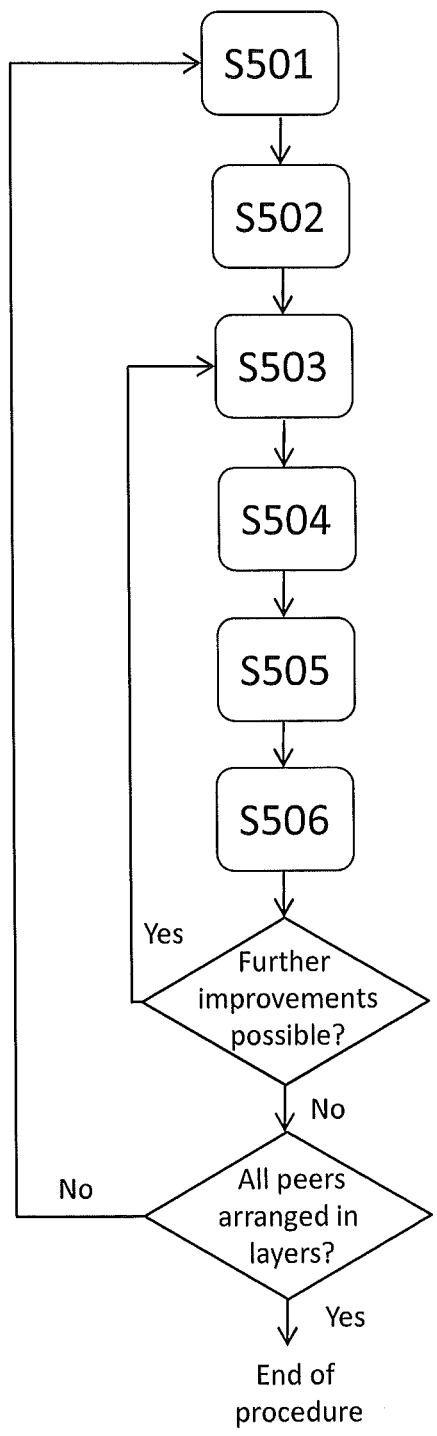
FIG. 6b illustrates a flow chart over a method of arranging peers in a virtual P2P overlay network according to an embodiment of the present invention.

Initially, the peers are structured in an array $P_a = \{P_1, P_2, P_3, \ldots, P_{|P|}\}$ and arranged in distribution layers, most likely in order of bandwidth, where a greater bandwidth implies closeness to the streaming source. Thus, peers are taken from $P_a$ and arranged in layers by starting at the first layer, the peers of which are supplied with data content directly from the streaming source. The arranging of peers in the first layer is such that (almost) all seats of the streaming source are used; it may be necessary to have some spare seats used for fallback purposes. Since there are no NAT restrictions between the sources(s) and any peer, connectivity between the first and the second layer is first considered. Thereafter, progression is made through subsequent layers. The procedure is repeated for successive pairs of layers up until the two layers which immediately precede the very last layer of the P2P overlay network. Hence, in a first round, interaction between layers r and r+1 is considered, in the second round interaction between layers r+1 and r+2 is considered, in the third round layers r+2 and r+3 are considered, and so on. In an embodiment of the present invention, between each two layers where NAT type restrictions (or other similar restrictions on P2P data streaming) exist, a virtual network is constructed, which is illustrated with reference to FIG. 6a, and a max-flow problem is solved. Thus, the tracker of the present invention (illustrated in FIG. 5) performs the following steps, where reference is made to the flow chart of FIG. 6b:

1. Scan the array $P_a$ of peers until a peer that have not yet been placed in any layer is found, step S501 of FIG. 6b. Use that peer and subsequent peers in the array to build layer r+1 such that that the potential number of downloaded data sub-streams in layer r+1 is at the maximal attainable level (i.e. does not exceed a maximum number of sub-streams that can be uploaded from the immediately preceding layer r).
2. The peers in rows r and r+1 are aggregated in step S502 by their respective NAT type to form new artificial nodes that are denoted $N_i^r$ and $N_j^{r+1}$ for layers r and r+1, respectively. Hence, all peers are categorized in particular NAT categories.

Thus, in the virtual network illustrated in FIG. 6, there exists a virtual source VS above layer r with data flow paths to all nodes in layer r. These data flow paths are generally referred to as "arcs". Each of these arcs has a capacity constraint given by $$u_{s,N_i^r} = \sum_{P_j \in P_{N_i,r}} \text{seat}(P_j).$$

An arc is present between nodes $N_i^r$ and $N_j^{r+1}$ if and only if $\delta(N_i, N_j) = 1$. Each such arc has a capacity constraint given by $$u_{N_i^r, N_j^{r+1}} = \gamma(N_i^r, N_j^{r+1}) \sum_{P_j \in P_{N_i,r}} \text{seat}(P_j).$$

On each arc between nodes in layer r+1 and a virtual sink VT, capacity can be expressed as $$u_{N_j^{r+1}, t} = h|P_{N_i, r+1}|.$$

The tracker of the present invention uses a max-flow approach to stream as much data as possible from the virtual source VS to the virtual sink VT. Potentially, due to NAT restrictions, there may be seats in layer r which will not be able to connect to peers in layer r+1.

Thus, the tracker proceeds to perform the step of:

3.1 Finding, in step S503, the NAT type in layer r+1 which in terms of number of required downloaded data sub-streams for fully rendering a given data content is the most unprovided for. That is, the tracker determines for distribution layer r+1 which particular NAT category has peers with the highest unfulfilled sub-stream download demand as compared to the other NAT categories in layer r+1, by calculating $$l = \underset{k}{\operatorname{argmax}}\left(u_{N_k^{r+1},t} - \text{download\_flow}(N_k, r+1)\right).$$

Or in other words, the difference between (a) the number of data sub-streams required to fully render data content originally distributed by the streaming source and (b) the actual number of data sub-streams downloaded is calculated for all NAT types, and by determining which of the NAT types has the maximal calculated difference, the NAT category containing peers with the least fulfilled sub-stream download requirements is determined.

To exemplify, if a first peer needs four sub-streams to fully reconstruct original content data but only receives three sub-streams, its download demand is effectively unfulfilled by one sub-stream. However, if another, second peer downloads a single data sub-stream, the download demand is unfulfilled by three sub-streams. Of these two peers, the second peer is the one with the least fulfilled data sub-stream download requirements. However, in this particular embodiment, the total number of lacking sub-streams for peers to be able to fully reconstruct data content streamed by the streaming source is considered for each NAT category.

The tracker thereafter performs the step of:

4. Finding, in the determined NAT category comprising peers with the least fulfilled data sub-stream download requirements, the peer with minimal upload capacity (step S504)

$$v = \underset{u}{\operatorname{argmin}}\left(\text{seat}(P_u \in P_{N_{L,r+1}})\right).$$

Thus, of all peers in the NAT category determined to have the least fulfilled sub-stream download requirements in layer r+1, the peer with the lowest upload capacity is identified. Advantageously, that particular peer would have the least disruptive impact on layer formation if it were to switch position with another peer that in the subsequent layer r+2.

The tracker proceeds to undertaking the step of:

5. Determining in step S505 which NAT types in distribution layer r have underutilized seats and which also have sufficient capacity to upload at least the h sub-streams required to fully render a given data content. For simplicity, residual capacity is defined as $$\text{resCap}_i^r = u_{s,N_i^r} - \text{upload\_flow}(N_i, r)$$

and the determined NAT type is given by $$\hat{N}^r = \{N_i \in N | \text{resCap}_i^r > h\}.$$

That is, it is determined which NAT categories have spare seats, i.e. which categories have seats not taken by a peer in layer r+1, and which also have capacity to upload the required number h of sub-streams.

Finally, the tracker performs the step of:

6. Finding, in step S506, a peer that can download the data content from currently unutilized seats in distribution layer r $$w = \underset{x}{\operatorname{argmax}}$$

$$\left(\text{seat}(P_x \in P \backslash \bigcup_{k=0}^{k=r+1} P_k \mid \exists N_i \in \hat{N}^r \wedge \gamma(N_i, \text{nat}(P_x))\text{resCap}_i^r) > h\right).$$

The peer $P_w$ to be found will replace a peer $P_v$ in layer r+1 that cannot receive data content due to NAT restrictions. Thus, a peer $P_w$ is to be found that has a maximum number of seats, which peer is not located in anyone of distributions layers 0 to r+1. Further, for the peer $P_w$ which will be moved to layer r+1, a peer in distribution layer r must exist that the peer $P_w$ can connect to, which (a) has available upload capacity, and
(b) belongs to a NAT category which is allowed to stream data content to the NAT category of peer $P_w$.

Thus, a first peer $P_v$ is replaced with a second peer $P_w$. In other words, according to the present invention, the tracker switches positions of the first peer $P_v$ (being restricted from distributing the data content to a further peer for NAT type reasons) and the selected second peer $P_w$ in the P2P overlay network.

Steps 3-6 outlined in the above are repeated, and peer positions are switched accordingly until no further improvements are attained for the successive pair of layers currently considered. Thereafter, steps 1-6 outlined in the above are repeated for the next successive pair of layers until all peers have been arranged in distribution layers.

At the end of the procedure outlined, peers have been assigned to distribution layers in such a manner that will reduce the risk of having peers falling back on the streaming source for downloading data content due to connectivity restrictions. As previously have been discussed, these restrictions are exemplified in the detailed description by means of NAT restrictions, but could just as well be exemplified with various other connectivity restrictions.

With reference to FIG. 6, the number of data content sub-streams that flow from peers of a certain NAT category in any given layer to peers of another NAT category in a subsequent layer—which is expressed as $x_{N_i^r, N_j^{r+1}}$—is determined, but the explicit assignment of which peers are connected to one another in these two NAT categories is still to be undertaken. The assignment of peers that follows from $x_{N_i^r, N_j^{r+1}}$ can be carried out arbitrarily, i.e, a peer is randomly selected from the set of peers $P_{N_{i,r}}$ and the seats of this randomly selected peer is assigned to peers in the set $P_{N_{j,r+1}}$. This is repeated until the total number of seats assigned it equal to $x_{N_i^r, N_j^{r+1}}$.

Alternatively, the assignment of which peers are connected to one another can be exploited by considering that there is a metric between any two peers, $M(P_\alpha, P_\beta)$, which defines a measure of the relative benefit to the P2P overlay network, if a connection between these particular two peers was. In such a case, the different possible peer connections that can be made can be expressed as a linear sum assignment problem (LSAP). Hence, overall utility of the P2P network can be improved with respect to the NAT connectivity constraints and bandwidth load that may be imposed on the streaming server by these constraints can be reduced.

Even though the invention has been described with reference to specific exemplifying embodiments thereof, many different alterations, modifications and the like will become apparent for those skilled in the art. The described embodiments are therefore not intended to limit the scope of the invention, as defined by the appended claims.

The invention claimed is:

1. A method of arranging a P2P overlay network comprising a streaming source arranged to stream data content and a plurality of peers arranged in distribution layers, the method comprising the steps of:
    arranging the peers in the distribution layers such that data content download requirements of peers in any one distribution layer does not exceed data content distribution capacity of peers in an immediately preceding distribution layer;
    selecting, when a first peer has capacity to distribute a data content stream to another peer in an immediately subsequent layer but is restricted from distributing the data content stream to said another peer, a second peer from a distribution layer subsequent to a distribution layer of the first peer, which second peer is not being restricted from distributing the data content stream to said another peer; and
    switching positions of the first peer and the selected second peer in the overlay network.

2. The method of claim 1, wherein the step of selecting further comprises:
    randomly selecting a second peer which is not restricted from distributing the data content stream to said another peer, which has sufficient capacity to distribute the data content stream uploading data content, and which is not restricted from receiving a data content stream from a peer that was distributing data content to the first peer.

3. The method of claim 1, further comprising the step of:
    categorizing the peers into different categories, wherein peers of one category are restricted from communicating with peers of a different category.

4. The method of claim 3, wherein the peers are categorized into different network address translation (NAT) categories.

5. The method of claim 1, wherein the arranging of peers in distribution layers is undertaken for successive pairs of layers such that data content streaming between any two layers is taken into consideration starting from the layer immediately subsequent to the streaming source and ending at the layer immediately preceding the last distribution layer.

6. The method of claim 3, further comprising the step of:
    determining, for the distribution layer in which the first peer is arranged, which category has peers with least fulfilled data content download requirements.

7. The method of claim 6, wherein the step of determining which category has peers with least fulfilled data content download requirements comprises:
    calculating, for each peer in the category, the argument of the difference between number of required downloaded data sub-streams for fully rendering a data content streamed by the streaming source and the actual number of data sub-streams downloaded.

8. The method of claim 6, further comprising the step of:
    determining which one of the peers in the category with the least fulfilled data content download requirement that has lowest upload capacity.

9. The method of claim 7, further comprising the step of:
    determining, in the distribution layer immediately preceding that of the first peer, which categories have unutilized upload capacity and that further have capacity to upload the required number of data sub-streams such that a downloading peer in an immediately subsequent distribution layer is able to fully render a data content.

10. The method of claim 9, further comprising the step of:
    identifying the second peer as the peer having the greatest upload capacity among peers located in distribution layers subsequent to the distribution layer of the first peer, which peers further are able to download the data content from a peer in the determined category having unutilized upload capacity, have available upload capacity, and belong to a category which is allowed to upload data content to first peer.

11. A device for arranging a P2P overlay network comprising a streaming source arranged to stream data content and a plurality of peers arranged in distribution layers, the device comprising:
    a processing unit being configured to
    arrange the peers in the distribution layers such that data content download requirements of peers in any one distribution layer does not exceed data content distribution capacity of peers in an immediately preceding distribution layer;
    select, when a first peer has capacity to distribute a data content stream to another peer in an immediately subsequent layer but is restricted from distributing the data content stream to said another peer, a second peer from a distribution layer subsequent to a distribution layer of the first peer, which second peer is not being restricted from distributing the data content stream to said another peer; and
    switch positions of the first peer and the selected second peer in the overlay network.

12. The device of claim 11, wherein the processing unit further is configured to:
    randomly select a second peer which is not restricted from distributing the data content stream to said another peer, which has sufficient capacity to distribute the data content stream uploading data content, and which is not restricted from receiving a data content stream from a peer that was distributing data content to the first peer.

13. The device of claim 11, wherein the processing unit further is configured to:
    categorize the peers into different categories, wherein peers of one category are restricted from communicating with peers of a different category.

14. The device of claim 13, wherein the peers are categorized into different network address translation (NAT) categories.

15. The device of claim 13, wherein the processing unit further is configured to:
    determine, for the distribution layer in which the first peer is arranged, which category has peers with least fulfilled data content download requirements.

16. The device of claim 15, wherein the processing unit is configured to, when determining which category has peers with least fulfilled data content download requirements:
    calculate, for each peer in the category, the argument of the difference between number of required downloaded data sub-streams for fully rendering a data content streamed by the streaming source and the actual number of data sub-streams downloaded.

17. The device of claim 15, wherein the processing unit further is configured to:
    determine which one of the peers in the category with the least fulfilled data content download requirement that has lowest upload capacity.

18. The device of claim 16, wherein the processing unit further is configured to:
    determine, in the distribution layer immediately preceding that of the first peer, which categories have unutilized upload capacity and that further have capacity to upload the required number of data sub-streams such that a downloading peer in an immediately subsequent distribution layer is able to fully render a data content.

19. The device of claim 18, wherein the processing unit further is configured to:
identify the second peer as the peer having the greatest upload capacity among peers located in distribution layers subsequent to the distribution layer of the first peer, which peers further are able to download the data content from a peer in the determined category having unutilized upload capacity, have available upload capacity, and belong to a category which is allowed to upload data content to first peer.

20. A computer program product comprising a memory having computer-executable components configured to cause a device to perform the steps recited in claim 1 when the computer-executable components are run on a processing unit included in the device.

* * * * *